W. F. CALDWELL.
Corn-Planter.
No. 58,060. Patented Sept. 18. 1866.
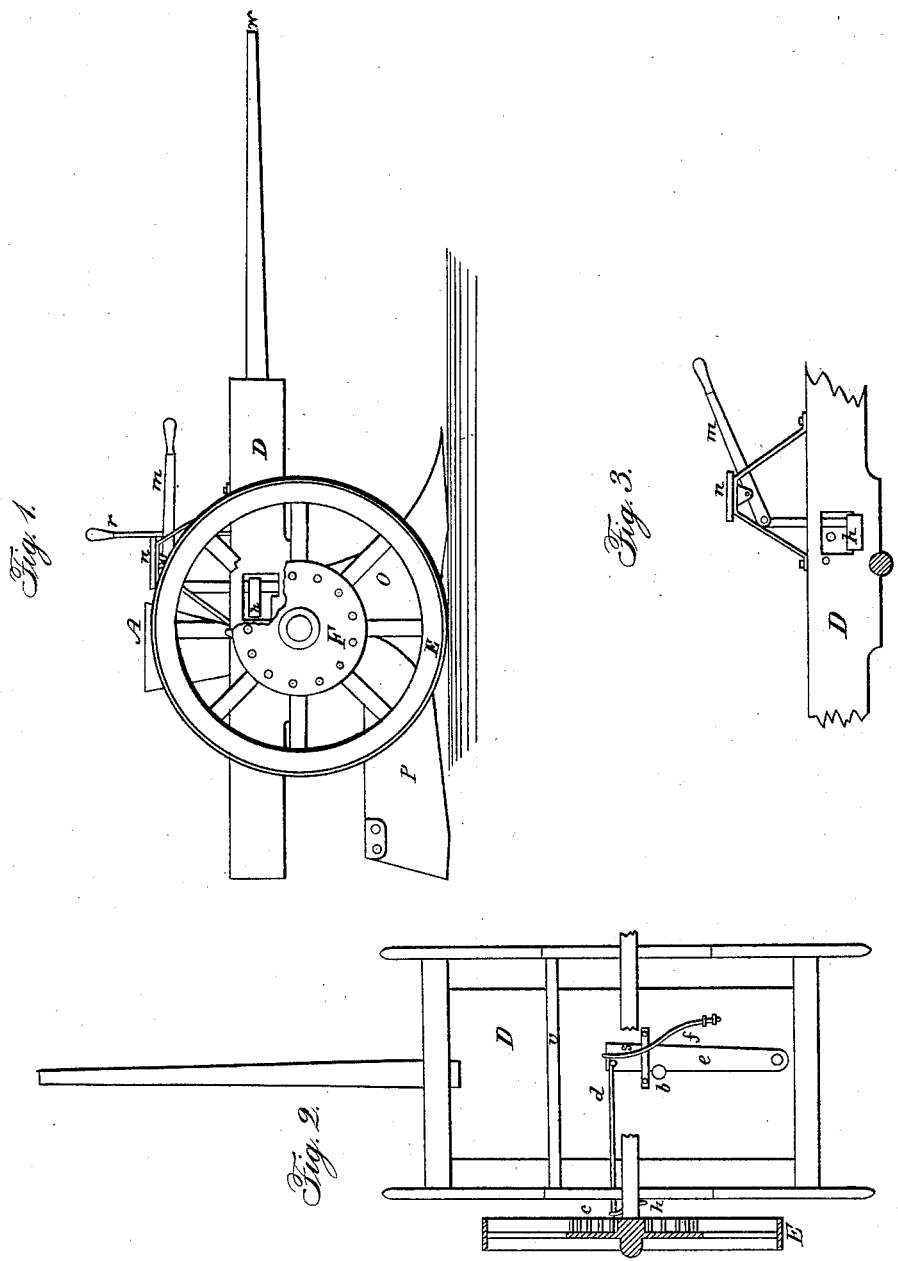
Witnesses:
William H. Clifford
Henry C. Houston
Inventor:
William F. Caldwell.

UNITED STATES PATENT OFFICE.

WILLIAM F. CALDWELL, OF OXFORD, MAINE.

IMPROVEMENT IN PLANTERS.

Specification forming part of Letters Patent No. 58,060, dated September 18, 1866.

*To all whom it may concern:*

Be it known that I, WILLIAM F. CALDWELL, of Oxford, in the county of Oxford and State of Maine, have invented a new and Improved Planter, for planting corn and other seeds; and I hereby declare the following to be a full, clear, and exact description thereof, which will enable others to make and use my invention, reference being made to the accompanying drawings, forming part of this specification, in which—

Figure 1 shows a side elevation of my improved planter; Fig. 2, a plan of the bottom of the carriage, illustrating the method of regulating the fall of the seed by the ratchet $c$ and pawl $d$; Fig. 3, a side view of the lever employed to throw the pawl out of the ratchet.

The same letters indicate like parts in each of the figures.

My invention consists in the combination of a ratchet-wheel, a pawl, and a hopper, arranged and applied as hereinafter described; also, in conjunction with the above-named devices, a lever to operate the pawl, as desired.

D shows a carriage running upon two wheels, and drawn by animal power by the shaft $w$. A, Fig. 1, shows the receptacle placed in the center of the carriage for the purpose of containing the seed; $b$, Fig. 2, an orifice in the bottom of the same. $e$ is a hopper, which, by the pressure of the spring $f$, is turned so as to cover and close the orifice $b$. $d$ is a pawl attached to the hopper, as shown in the drawings, and extending across the body of the carriage D to the wheel E, and on its end fitted with the tongue or head $h$. Upon the inner side of the wheel E is the ratchet $c$ on the circular plate F.

The hopper, spring, and pawl are placed on the under side of the carriage, as shown in Fig. 2. As the wheel E revolves by the motion of the carriage the pawl receives an oscillating motion by the collision of the tongue or head $h$ with the ratchet. By this motion is imparted to the hopper $e$, which alternately opens and closes the orifice $b$, and allows the seed to drop from the receptacle A at regular intervals. The hopper is confined by the pivot $i$ and staple $s$, Fig. 2. $m$ shows a lever and link, by which the head $h$ of the pawl can be thrown out of the ratchet by elevating the lever, as seen in Fig. 3. By moving the lever, as seen in Fig. 1, the head $h$ is again brought in contact with the ratchet. The lever $m$ is placed under the driver's seat $n$, and has its fulcrum attached thereto, as seen in Fig. 3. $o$ shows the plow, by which the furrow for the deposit of the seed is made; $p$ the device for closing and covering the furrows. $r$ shows a lever, by which the plow $o$ can be lifted from the ground when desired, and by which the depth of the furrow can be regulated. The plow and coverer are attached also to the carriage-body by pivots at their upper ends, so as to admit of their motion upward and downward. This lever swings on a fulcrum on the cross-beam $v$, Fig. 2, and lifts the plow by being pushed from one side to another. It is held in any position by fitting into notches on the driver's seat. The orifice $b$ is so located as to drop the seed between the plow $o$ and coverer $p$, as indicated in Fig. 1.

I do not claim operating the above-described planter by means of the revolution of the carriage-wheels, neither do I claim the plow $o$, the coverer $p$, or the lever $r$; but What I do claim, and desire to secure by Letters Patent, is—

1. The combination and arrangement of the hopper $e$, spring $f$, pawl $d$, ratchet $c$, lever and link $m$, all constructed, applied, and operating as herein set forth and described.

2. Connecting the plow and coverer to the carriage-body in the manner described.

WILLIAM F. CALDWELL.

Witnesses:
WILLIAM H. CLIFFORD,
HENRY C. HOUSTON.